Sept. 13, 1966 W. SOBOTKA 3,273,074

ELECTRONICALLY TUNABLE MAGNETRON-TYPE MICROWAVE GENERATOR

Filed July 20, 1964 4 Sheets-Sheet 1

INVENTOR:
*Walter SOBOTKA*

BY Paul M. Craig, Jr.
ATTORNEY

Sept. 13, 1966 W. SOBOTKA 3,273,074

ELECTRONICALLY TUNABLE MAGNETRON-TYPE MICROWAVE GENERATOR

Filed July 20, 1964

4 Sheets-Sheet 2

INVENTOR:
*Walter SOBOTKA*

BY *Paul M. Craig, Jr.*
ATTORNEY

Sept. 13, 1966 W. SOBOTKA 3,273,074

ELECTRONICALLY TUNABLE MAGNETRON-TYPE MICROWAVE GENERATOR

Filed July 20, 1964 4 Sheets-Sheet 3

INVENTOR:
Walter SOBOTKA

BY Paul M. Craig, Jr.
ATTORNEY

INVENTOR:
Walter SOBOTKA

BY Paul M. Craig, Jr.
ATTORNEY 3,273,074
Patented Sept. 13, 1966

3,273,074

ELECTRONICALLY TUNABLE MAGNETRON-TYPE MICROWAVE GENERATOR

Walter Sobotka, 79 Blvd. Haussmann, Paris, France

Filed July 20, 1964, Ser. No. 383,673
Claims priority, application France, July 31, 1963, 943,271, Patent 1,372,557
10 Claims. (Cl. 331—50)

The present invention relates to the production of microwave oscillations by means of magnetron type tubes.

Among the magnetron tubes, actually in use in the microwave technique, one distinguishes between the conventional tubes, having a very narrow tuning band (of the order of five percent of the nominal frequency), and those with electronic tuning, conceived to be tunable within a relatively wide band (of the order of an octave) by the adjustment of the anode voltage. The tubes with narrow comprise, as is well known, resonant cavities having, under load, a high quality factor Q (greater than 30) and the efficiency of these tubes is high (of the order of 60%–70%). The tubes with wide tuning band owe their widened frequency range to the use of structures permitting to reduce the loaded Q (tight coupling with the external load), and the efficiency of these tubes is greatly reduced (to about 10%–20%).

The present invention has as its object a microwave oscillator of the magnetron type, having at the same time a relatively high efficiency and a relatively wide tuning band.

To attain this objective, the present invention utilizes assemblies comprising a certain number of elemental magnetrons, grouped in an appropriate manner with a common enclosure.

Already known in the prior art are the arrangements with magnetrons grouped according to the copending U.S. patent application, Serial No. 152,273 for "High Power Electron Discharge Device of the Traveling Wave Tube Type," filed in the name of Bernard Epsztein, and assigned to the same assignee as the present application, but with the difference from these known arrangements operable substantially as amplifiers, the present invention provides assemblies specially acted upon and adapted to operate as electronically tunable oscillators.

According to the present invention, a microwave generator is constituted by an assembly of elemental magnetrons, preferably of the type with interdigital structures, coupled with one another and disposed side by side within a common evacuated enclosure, formed by a wave guide portion, closed at one of the extremities thereof by a short-circuit and at the other extremity thereof by a vacuum-tight window, transparent to electromagnetic waves, an absorption means being placed on the inside of the wave guide near the short-circuited extremity.

Accordingly, it is an object of the present invention, to provide a microwave oscillator assembly which excels by relatively high efficiency, yet offers a considerably wider tuning band than realizable heretofore with devices of similar efficiency.

Another object of the present invention resides in the provision of an oscillator assembly adapted to be electronically tuned which utilizes a plurality of cooperating elemental magnetron oscillators.

Still another object of the present invention resides in the provision of an electronically tunable magnetron-type microwave generator assembly utilizing individual magnetron type structures which maintains a high efficiency in the presence of a tight coupling between the elemental magnetron structures as well as the last such structure and the external load.

A further object of the present invention resides in the provision of a microwave generator utilizing a plurality of elemental magnetron structures so assembled and arranged as to operate as high-efficiency electronically-tunable oscillator.

These and other objects, features and advantages of the present invention will become more obvious from the following description when taken in connection with the accompanying drawing which shows, for purposes of illustration only, several embodiments in accordance with the present invention, and wherein FIGURE 1 is a cross-sectional view, taken along line I—I of FIGURE 2, through a first embodiment of a magnetron type microwave generator according to the present invention;

Figure 1:
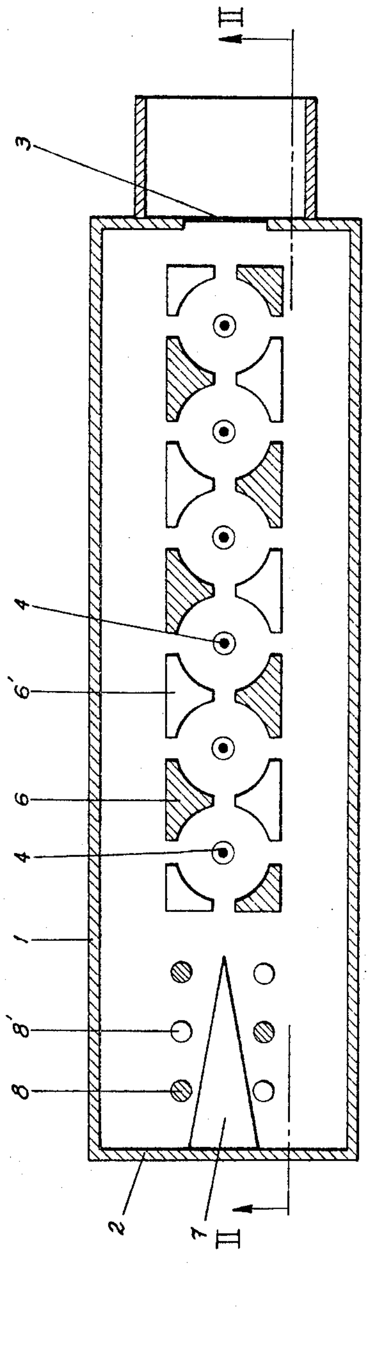
Figure 2:
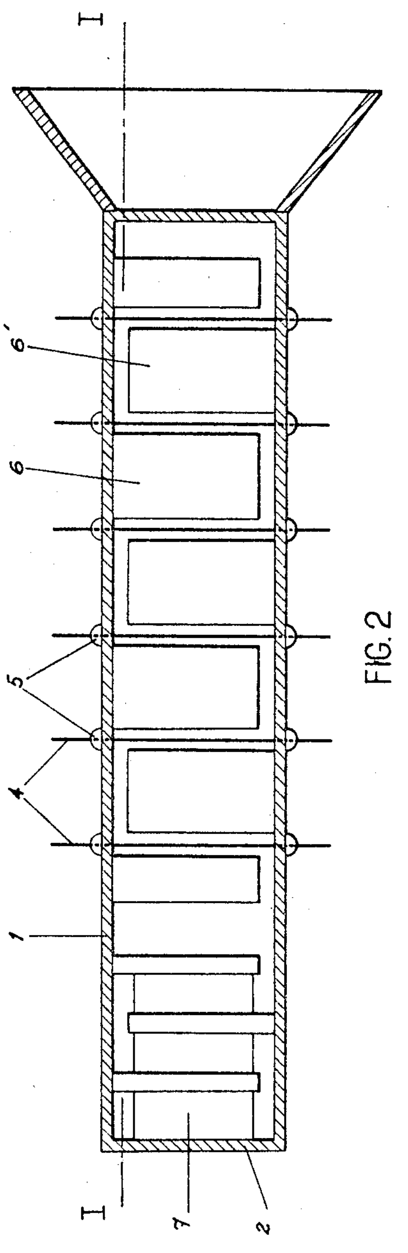
FIGURE 2 is a cross-sectional view through the microwave generator of FIGURE 1, taken along line II—II of FIGURE 1.

Referring now to the drawing wherein like reference numerals are used throughout the various views to designate like parts, and more particularly to FIGURES 1 and 2, the microwave oscillator illustrated therein is constituted by an assembly of *n* magnetrons, disposed in cascade, *n* being equal to six in the illustrated embodiment. The tubes are placed within a vacuum-tight enclosure constituted by a wave guide 1, closed at one end thereof by a metallic wall 2 and at the other end thereof by window 3 of insulating material, tight to the air and transparent to the electromagnetic waves.

Each of the elemental magnetrons comprises an emissive cathode 4, of which the extremities traverse insulating passages 5, and an anode in the form of interdigital structure, composed of fingers 6 and 6', fixed alternately to the upper and lower walls of the wave guide 1.

In each tube, the interaction space, formed by the space between the anode 6, 6' and cathode 4, communicates with that of the adjacent tube which assures a tight reciprocal coupling.

In front of the wall 2 of the wave guide 1, is placed an absorption means comprising a wedge-shaped absorbing element 7 and interdigital elements 8 and 8', fixed alternately to the upper and lower walls of the guide 1, like the elements 6 and 6'. The wedge-shaped element 7, constituted by a block of absorbing material or by a metallic block, covered with a layer of conventional absorbing material, may optionally be provided with a cooling system.

In operation, the wave guide 1 is placed within a magnetic field parallel to the cathodes 4, produced by a suitable, conventional magnet (not shown) such as permanent magnet or electromagnet, cathodes 4 are heated by a conventional heating source (not illustrated) and the anodes 6, 6' are carried at a positive potential with respect to the cathodes 4 by means of an appropriate conventional anode voltage source (not shown).

The individual magnetrons then oscillate at a common frequency, imposed by the first magnetron of the cascade, that is, the one placed nearest the absorption means 7. The high-frequency energy thus produced traverses the window 3 and may be utilized according to any desired manner, whereas the control of the frequency may be effected electronically by acting on the anode voltage of the assembly.

In effect, when the starting current of the first magnetron is reached, the high-frequency wave which it produces propagates forwardly and rearwardly. The energy transmitted toward the rear is absorbed in the wedge-shaped absorbing member 7, whereas the energy which is transmitted forwardly excites the following magnetrons which, in their turn, send one portion of the high-frequency energy thereof forwardly and the other portion toward the rear where it is absorbed. Thus in each magnetron the high-frequency energy produced by the tube is added to the high-frequency energy received from the tubes which precede the same in the cascade, the effects thus being cumulative up to the last elemental tube, near the output of the guide 1. The last tube therefore operates with a high-frequency signal of strong amplitude with respect to the anode voltage, and it is known that under these conditions the efficiency is very good. As regards the possible tuning band, it is wide owing to the fact that the output of the guide 1. The last tube therefore operates plings on the one hand, between the elemental tubes and, on the other, between the last tube at the output side and the anode structures utilized permit to realize tight cou- of tunable magnetrons.

Figure 3:
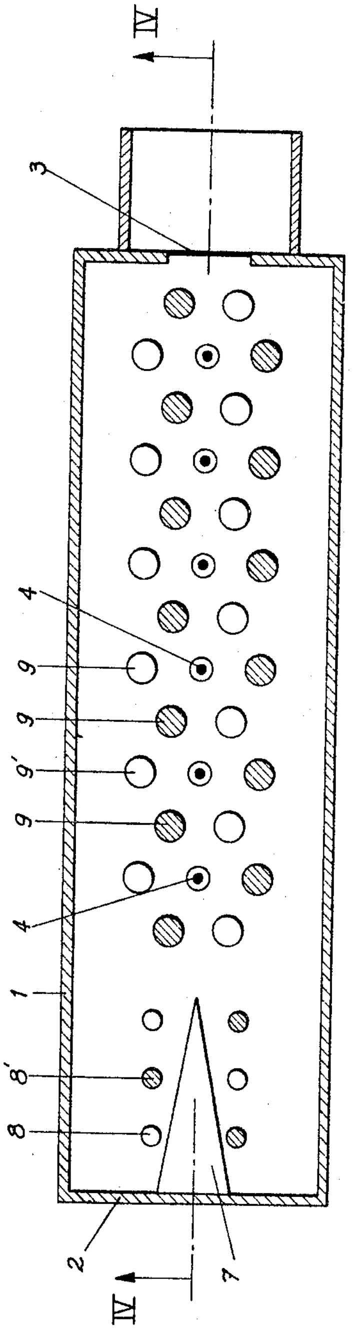
FIGURE 3 is a cross-sectional view of a modified embodiment of a magnetron type microwave generator in accordance with the present invention, taken along line III—III of FIGURE 4.
Figure 4:
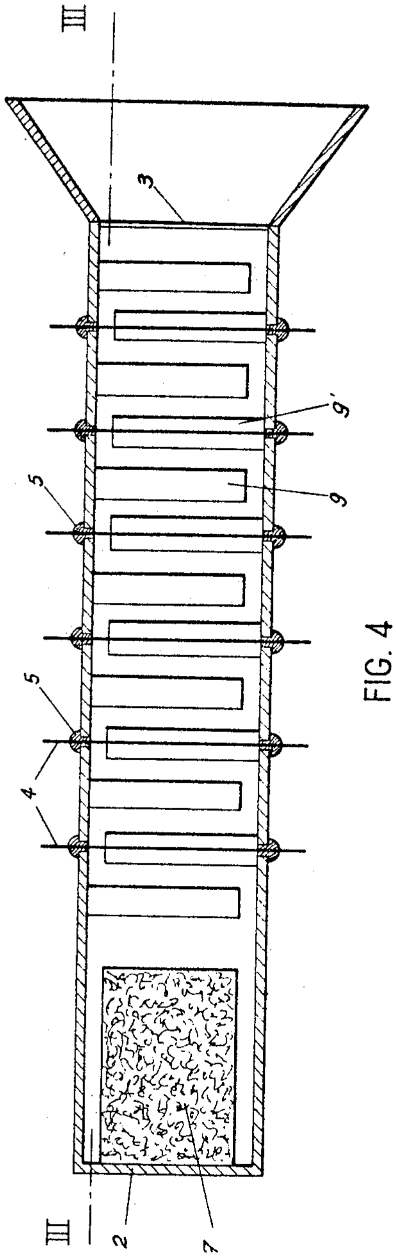
FIGURE 4 is a cross-sectional view through the microwave generator of FIGURE 3, taken along line IV—IV of FIGURE 3.

In FIGURES 1 and 2, the anode of each tube is constituted by an interdigital structure composed of four elements 6, 6'. FIGURES 3 and 4 represent an example in which each anode is formed by an interdigital structure having six elements, designated by reference numerals 9 and 9'.

In the magnetrons illustrated in FIGURES 1 to 4, the electron sources are constituted by emissive cathodes with direct heating, but they may, of course, be replaced by cathodes with indirect heating or by cathodes having cold emission.

Figure 5:
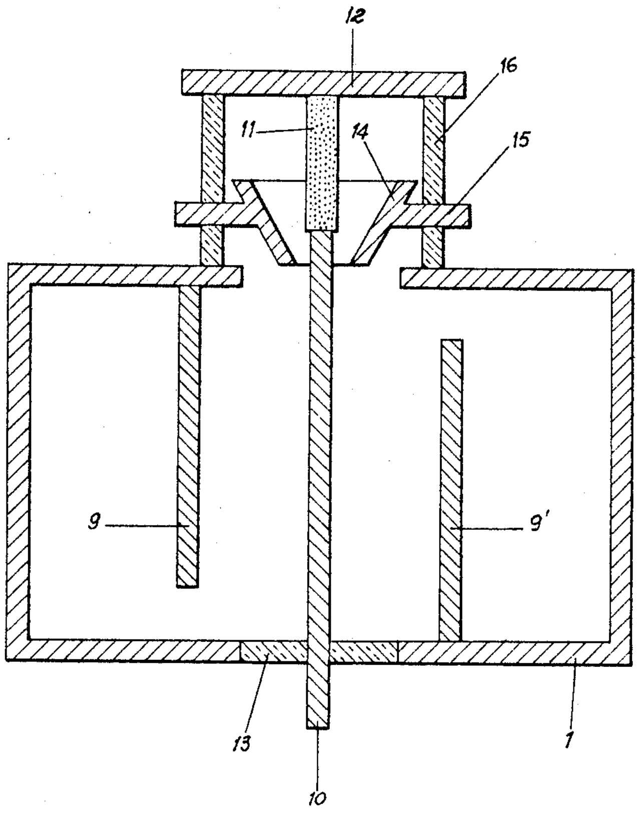
FIGURE 5 is a somewhat schematic cross-sectional view through a modified embodiment of a microwave generator in accordance with the present invention.

One may also place the electron source of each magnetron outside of the interaction space of the tube by utilizing injection systems as shown in FIGURE 5, which illustrates a tube in cross section. In the embodiment of FIGURE 5, a metallic rod 10, placed along the axis of the tube, carries at its upper part a hollow cylinder 11, covered with an emissive layer and heated by a helicoidal filament (not shown in the drawing), placed on the inside of this cylinder 11. The lower extremities of the emissive cylinder 11 and of the heating filament are connected to the upper extremity of the central rod 10 whereas the upper extremity of the filament is connected to the metallic plate 12. To heat the filament, one thus connects the heating source between the plate 12 and the rod 10 of which the lower extremity, traversing in a vacuum-tight manner the insulating plate 13, is accessible from the outside of the guide.

About the lower portion of the emissive cylinder 11 is disposed a control electrode 14, formed by a metallic surface, inclined with respect to the axis of the tube, and integral with metallic supports 15 which traverse, in a vacuum-tight manner, the walls of insulating material 16.

The central rod 10, constituting the cathode of the tube, is connected to the negative terminal of the anode voltage source of which the positive terminal is connected to the interdigital anode 9, 9' (or 6, 6'). The control electrode 14 is carried across one of the supports 15 at a positive potential, lower than that of the anode. It is known that under these conditions the electrons emitted by the source 11 are injected into the interaction space comprised between the central rod 10 and the anode structure 9, 9' (or 6, 6'), and that by acting on the potential of the control electrode 14, one may cause to vary the intensity of the electron flow injected into the tube. One thus possesses a means permitting to obtain in the last tubes of the magnetron assembly, i.e., those nearer the window 3, more intense electron currents than in the first tubes which favors the production of important energies at the output of the wave guide 1.

In the example of FIGURES 1 to 4, the adjoining magnetrons are aligned according to a single direction, that is into a uni-dimensional device. However, the present invention is also realizable with a bi-dimensional device, as shown in FIGURES 6 and 7.

Figure 6:
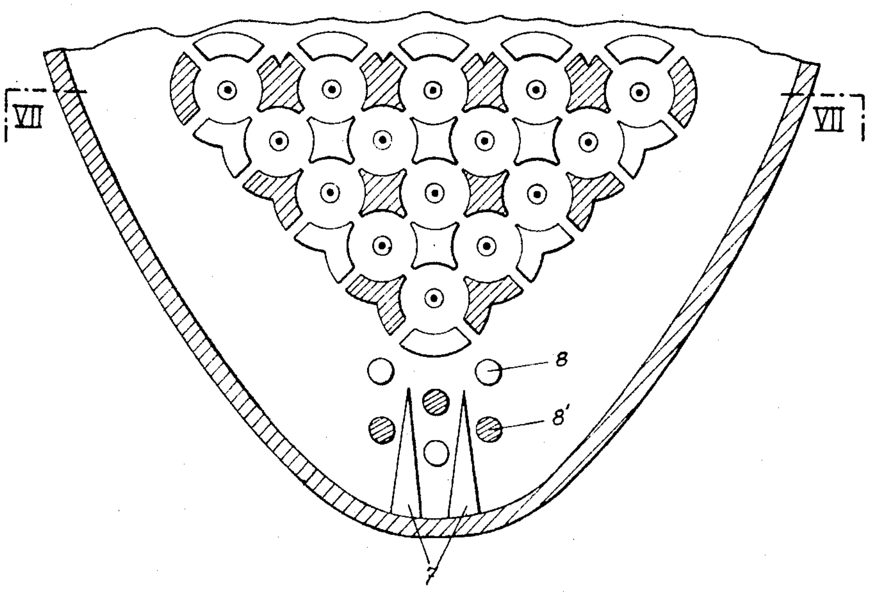
FIGURE 6 is a partial cross-sectional view, taken along line VI—VI of FIGURE 7 of a still further modified bi-dimensional microwave generator in accordance with the present invention.
Figure 7:
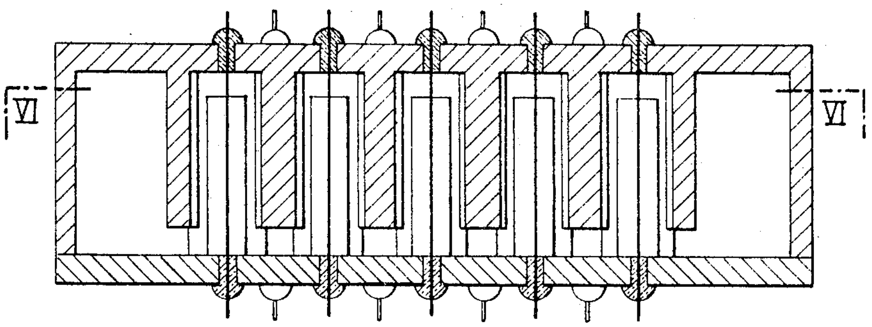
FIGURE 7 is a cross-sectional view of the microwave generator of FIGURE 6, taken along line VII—VII of FIGURE 6.

FIGURE 6 shows in plan view the arrangement of the elemental magnetrons and of the absorbing means comprising the wedge-shaped absorbing elements 7 and the interdigital element 8 and 8'.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A multi-magnetron oscillator arrangement comprising:

an elongated evacuated enclosure having two terminal walls, one of said walls being provided with a window transparent to electromagnetic waves, absorbing means disposed within the enclosure adjacent the other terminal wall, and a number of magnetron means, coupled to each other and disposed within the enclosure between said absorbing means and said window.

2. A multi-magnetron oscillator arrangement comprising:

an elongated evacuated enclosure having two terminal walls, one of said walls being provided with a window transparent to electromagnetic waves, absorbing means disposed within the enclosure adjacent the other terminal wall, and a number of magnetron means, coupled to each other and disposed within the enclosure between said absorbing means and said window, each magnetron means including cathode and anode means, said anode means being formed by an interdigital structure, and said cathode and anode means defining therebetween an interaction space.

3. A multi-magnetron oscillator arrangement comprising:

an elongated evacuated enclosure having two terminal walls, one of said walls being provided with a window transparent to electromagnetic waves, absorbing means disposed within the enclosure adjacent the other terminal wall, and a number of magnetron means, coupled to each other and disposed within the enclosure between said absorbing means and said window, each magnetron means including cathode and anode means, said anode means being formed by an interdigital structure, and said cathode and anode means defining therebetween an interaction space, said cathode means being electron emissive cathode structures.

4. A multi-magnetron oscillator arrangement comprising:

an elongated evacuated enclosure having two terminal walls, one of said walls being provided with a window transparent to electromagnetic waves, absorbing means disposed within the enclosure adjacent the other terminal wall, and a number of magnetron means, coupled to each other and disposed within the enclosure between said absorbing means and said window, each magnetron means including cathode and anode means, said anode means being formed by an interdigital structure, and said cathode and anode means defining therebetween an interaction space, each magnetron means including means forming a source of electrons located outside of said interaction space and operable to inject electrons into said space.

5. A multi-magnetron oscillator arrangement comprising:

an elongated evacuated enclosure having two terminal walls, one of said walls being provided with a window transparent to electromagnetic waves, absorbing means disposed within the enclosure adjacent the other terminal wall, and a number of magnetron means, coupled to each other and disposed within the enclosure between said absorbing means and said window, the magnetron means being aligned in one row extending between the terminal walls of the enclosure.

6. A multi-magnetron oscillator arrangement comprising:

an elongated evacuated enclosure having two terminal walls, one of said walls being provided with a window transparent to electromagnetic waves, absorbing means disposed within the enclosure adjacent the other terminal wall, and a number of magnetron means, coupled to each other and disposed within the enclosure between said absorbing means and said window, the magnetron means being aligned in mutually intersecting directions.

7. An electronically tunable magnetron-type microwave generator comprising:

first means providing a substantially vacuum-tight enclosure having window means transparent to electromagnetic waves, absorbing means disposed within said enclosure, a plurality of magnetron means within said enclosure and separating said window and absorbing means, and means for mutually coupling adjacent magnetron means with each other in such a manner as to provide a cascade arrangement thereof with part of the generated microwave energy flowing in one direction being absorbed by said absorbing means while the other part of the generated microwave energy adds cumulatively through cascaded magnetron means for eventual passage through said window means.

8. An electronically tunable magnetron-type microwave generator comprising:

first means providing a substantially vacuum-tight enclosure having window means transparent to electromagnetic waves, absorbing means disposed within said enclosure, a plurality of magnetron means, within said enclosure and separating said window and absorbing means, and means for mutually coupling adjacent magnetron means with each other in such a manner as to provide a cascade arrangement thereof with part of the generated microwave energy flowing in one direction being absorbed by said absorbing means while the other part of the generated microwave energy adds cumulatively through cascaded magnetron means for eventual passage through said window means, each magnetron means including anode and cathode means, and means for increasing the current intensities by the electrons emitted from the cathode means in respective magnetron means in a direction toward said window means.

9. An electronically tunable magnetron-type microwave generator operable upon application of an anode voltage comprising:

first means providing a substantially vacuum-tight enclosure having window means transparent to electromagnetic waves, absorbing means disposed within said enclosure, a plurality of magnetron means within said enclosure and separating said window and absorbing means, and means for mutually coupling adjacent magnetron means with each other in such a manner as to provide a cascade arrangement thereof with part of the generated microwave energy flowing in one direction being absorbed by said absorbing means while the other part of the generated microwave energy adds cumulatively through cascaded magnetron means for eventual passage through said window means, and means for varying the frequency of oscillation of said generator by acting on the anode voltage thereof.

10. An electronically tunable magnetron-type microwave generator operable upon application of an anode voltage comprising:

first means providing a substantially vacuum-tight enclosure having window means transparent to electromagnetic waves, absorbing means disposed within said enclosure, a plurality of magnetron means within said enclosure and separating said window and absorbing means, and means for mutually coupling adjacent magnetron means with each other in such a manner as to provide a cascade arrangement thereof with part of the generated microwave energy flowing in one direction being absorbed by said absorbing means while the other part of the generated microwave energy adds cumulatively through cascaded magnetron means for eventual passage through said window means, each magnetron means including anode and cathode means, and means for increasing the current intensities by the electrons emitted from the cathode means in respective magnetron means in a direction toward said window means, and means for varying the frequency of oscillation of said generator by acting on the anode voltage thereof.

References Cited by the Examiner

UNITED STATES PATENTS 2,667,580 1/1954 Litton ------------ 331—88 X

FOREIGN PATENTS 1,093,917 12/1960 Germany.

ROY LAKE, *Primary Examiner.*

S. H. GRIMM, *Assistant Examiner.*